United States Patent
Matsubara et al.

(10) Patent No.: US 7,652,246 B2
(45) Date of Patent: Jan. 26, 2010

(54) OPTICAL PICKUP DEVICE AND OPTICAL DISK DEVICE

(75) Inventors: Daisuke Matsubara, Tokyo (JP); Masahisa Shinoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 112 days.

(21) Appl. No.: 11/886,588

(22) PCT Filed: Apr. 24, 2006

(86) PCT No.: PCT/JP2006/308519
§ 371 (c)(1),
(2), (4) Date: Sep. 18, 2007

(87) PCT Pub. No.: WO2006/126357
PCT Pub. Date: Nov. 30, 2006

(65) Prior Publication Data
US 2009/0078857 A1    Mar. 26, 2009

(30) Foreign Application Priority Data
May 26, 2005 (JP) .............................. 2005-154103

(51) Int. Cl.
*G01D 5/36* (2006.01)
*G01D 5/38* (2006.01)
*G01J 1/04* (2006.01)

(52) U.S. Cl. .............................. 250/237 R; 250/237 G; 250/552; 372/43.01; 369/112.03

(58) Field of Classification Search ............. 250/237 R, 250/552, 216, 237 G; 372/43.01; 369/112.03
See application file for complete search history.

(56) References Cited

U.S. PATENT DOCUMENTS 5,402,436 A    3/1995  Paoli (Continued)

FOREIGN PATENT DOCUMENTS

DE    690 26 958 T2    9/1996

(Continued)

OTHER PUBLICATIONS

Web page <http://techon.nikkeibp.co.jp/members/News/20040716/104521/>, Jul. 16, 2004, Nikkei BP corporation, Philips, Netherlands, has developed an optical head capable of performing recording and reproducing on CD, DVD and Blu-ray Disk.

(Continued)

*Primary Examiner*—Seung C Sohn
(74) *Attorney, Agent, or Firm*—Birch, Stewart, Kolasch & Birch, LLP

(57) ABSTRACT

A laser emitting device (9) includes a light emitting portion (4) that emits light of a wavelength $\lambda 1$ (approximately 405 nm), a light emitting portion (5) that emits light of a wavelength $\lambda 2$ (approximately 650 nm), and a light emitting portion (6) that emits light of a wavelength $\lambda 1$ (approximately 780 nm). The light emitting position of the light emitting portion (4) and the light emitting position of the light emitting portion (6) are approximately on the same position as seen in the direction of an optical axis of emitted light of the laser emitting device (9). An optical axis adjusting element (18) is provided for adjusting an optical axis of return light of at least one of the wavelengths among return lights of the wavelengths $\lambda 1$, $\lambda 2$ and $\lambda 3$ so that respective return lights emitted by the light emitting portions (4, 5 and 6) of the laser emitting device (9) and reflected by an optical recording medium (16) are received by a common light detector (20).

10 Claims, 16 Drawing Sheets

U.S. PATENT DOCUMENTS

| | | |
|---|---|---|
| 2001/0022690 A1 | 9/2001 | Takeda |
| 2002/0024916 A1 | 2/2002 | Ueyama et al. |
| 2005/0254391 A1 | 11/2005 | Nagatomi et al. |

FOREIGN PATENT DOCUMENTS

| | | |
|---|---|---|
| EP | 1 472 682 B1 | 11/2004 |
| JP | 7-211991 A | 8/1995 |
| JP | 11-134702 A | 5/1999 |
| JP | 2001-143312 A | 5/2001 |
| JP | 2001-256670 A | 9/2001 |
| JP | 2002-092933 A | 3/2002 |
| JP | 2005-327387 A | 11/2005 |
| JP | 2006-209939 A | 8/2006 |
| JP | 2006-278576 A | 10/2006 |
| WO | WO-91/09397 A1 | 6/1991 |

OTHER PUBLICATIONS

Web page <http://www.sony.co.jp/SonyInfo/News/Press_Archive/200405/04-026/>, May 17, 2004, Sony corp., An optical head for three-wavelength recording and reproducing corresponding to Blu-ray, disk, DVD and CD has been developed.

OPTICAL PICKUP DEVICE AND OPTICAL DISK DEVICE

TECHNICAL FIELD

This invention relates to an optical pickup device capable of performing recording, reproducing or the like of information on a plurality of kinds of optical recording media. In particular, this invention relates to an optical pickup device and an optical disk device having a common light detector that receives lights of different wavelengths emitted by a three-wavelength integrated laser emitting device.

BACKGROUND ART

Conventionally, a two-light source type optical pickup device is used to perform recording, reproducing or the like (recording, reproducing or both) of information on a DVD (Digital Versatile Disk) and a CD (Compact Disk). The two-light source type optical device includes a laser emitting device for DVD that emits light of the wavelength of approximately 650 nm and a laser emitting device for CD that emits light of the wavelength of approximately 780 nm. Furthermore, in order to reduce the sizes of the respective light sources, a two-wavelength integrated laser emitting device capable of emitting two kinds of wavelengths with one package has become practical. As the two-wavelength integrated laser emitting device, there are known a monolithic laser emitting device having two laser diodes formed on a monolithic semiconductor, a hybrid-type laser emitting device having two bonded semiconductor substrates on which laser diodes are respectively formed, or the like.

In the case of the two-wavelength integrated laser emitting device, respective emitting positions of the two laser diodes (laser diodes for DVD and CD) are slightly apart from each other, and the distance therebetween is approximately 110 μm in general. Therefore, when the optical axis of one of the laser diodes is aligned with a system optical axis passing through an objective lens or a collimator lens of an optical pickup device, the optical axis of the laser light emitted by the other laser diode is shifted from the system optical axis. In this state, it is not possible for a common light detector to receive both return lights emitted by the laser diodes for DVD and CD and reflected by the optical recording medium. Therefore, it is proposed to diffract both of or either of the return lights of the emitted lights from the laser diodes for DVD and CD using a diffraction grating or the like so as to introduce both return lights to the common light detector (see Patent Document Nos. 1 and 2).

Further, as the optical recording medium is recently required to have a large capacity, an optical recording medium such as an optical disk for a blue-violet laser or the like having a capacity several times that of DVD or CD has become practical. As a result, in terms of the reduction in size and cost, it is demanded to enable the recording, reproducing or the like of information on optical recording media (such as DVD, CD, an optical disk for blue-violet laser or the like) using a common optical pickup device. Therefore, a three-light source type optical pickup device having the laser diode for blue-violet in addition to the laser diodes for DVD and CD has been developed.

The following first and second configurations have been proposed as examples of the three-light source type optical pickup device. The first configuration includes three laser emitting devices emitting lights of different wavelengths. Optical axes of the lights (of the different wavelengths) emitted by the respective laser emitting devices are aligned with a system optical axis using prisms provided corresponding to the respective wavelengths, and the lights of the respective wavelengths are introduced to an optical recording medium. The return lights of the three kinds of wavelengths reflected by the optical recording medium are introduced to a common light detector via the respective prisms, and are detected by the light detector (see, for example, a Non-Patent Document No. 1).

The second configuration uses a three-wavelength integrated laser emitting device including three semiconductor substrates emitting lights of different wavelengths $\lambda 1$, $\lambda 2$ and $\lambda 3$ integrated in one package. The emitting position of the light of the wavelength $\lambda 1$ (405 nm) and the emitting position of the light of the wavelength $\lambda 2$ (660 nm) are approximately the same, as seen in the direction of the optical axis of the emitted light of the laser emitting device. The emitting position of the light of the wavelength $\lambda 3$ (785 nm) is apart from the respective emitting positions of the lights of the wavelengths $\lambda 1$ and $\lambda 2$ by approximately 110 μm. Among the return lights emitted by the three-wavelength integrated laser emitting device and reflected by the optical recording medium, the return lights of the wavelengths $\lambda 2$ and $\lambda 3$ are detected by a common light detector. The return light of the wavelength $\lambda 1$ is separated by the prism and is detected by another light detector (see, for example, a Non-Patent Document No. 2).

Patent Document No. 1: Japanese Laid-Open Patent Publication No. 2001-143312.

Patent Document No. 2: Japanese Laid-Open Patent Publication No. 2001-256670.

Non-Patent Document No. 1: "Philips, Netherlands, has developed an optical head capable of performing recording and reproducing on CD, DVD and Blu-ray Disk" [online], Jul. 16, 2004, Nikkei BP corporation [accessed on Feb. 20, 2005], internet <http://techon.nikkeibp.co.jp/members/NEWS/20040716/104521/>.

Non-Patent Document No. 2: "An optical head for three-wavelength recording and reproducing corresponding to Blu-ray disk, DVD and CD has been developed" [online], May 17, 2004, Sony corporation [accessed on Feb. 20, 2005], internet <http://www.sony.co.jp/SonyInfo/News/Press/200405/04-026/>.

DISCLOSURE OF THE INVENTION

Problems to be Solved by the Invention

However, in the above described first configuration (Non-Patent Document No. 1), although the return lights reflected by the optical recording medium can be detected by the common detector, it becomes necessary to provide a large number of optical components (prism or the like) for aligning the optical axes of the respective laser emitting devices with the system optical axis of the optical pickup device. As a result, there is a problem that the reduction in size and cost of the device becomes difficult.

Further, in the above described second configuration (Non-patent Document No. 2), it becomes necessary to provide a prism for separating the return light of the wavelength $\lambda 1$ and an exclusive light detector for detecting the return light of the wavelength $\lambda 1$, and it becomes necessary to provide some sort of adjusting means of optical axes to cause the return lights of the wavelengths $\lambda 2$ and $\lambda 3$ to be received by the common light detector. Therefore, there is a problem that the reduction in size and cost becomes difficult.

In this regard, in two-light source type optical pickup device, the reduction in size and cost is accomplished by utilizing a phase-difference type diffraction grating (Patent Document Nos. 1 and 2), and therefore it is considered to similarly utilize the phase-difference type diffraction grating in the three-light source type optical pickup device. However, in the phase-difference type diffraction grating, a wavelength $\lambda$ of the incident light, an incident angle $\theta$ of the incident light, a refractive index n of a medium, an exit angle $\theta'$ of an emitted light, a refractive index n' of a medium, an order m of diffracted light and a pitch P of the diffraction grating satisfy the relationship:

$n \sin \theta - n' \sin \theta' = m \lambda/p,$ and therefore the first or higher order diffracted lights of three different wavelengths incident (in parallel to each other) on the diffraction grating have different diffraction angles. Therefore, there is a problem that it is difficult to introduce the return lights of the three different wavelengths to the common light detector.

Further, it is also considered to apply the phase-difference type diffraction grating (Patent Document Nos. 1 and 2) to the above described optical pickup device (Non-Patent Document Nos. 1 and 2) using the three-wavelength integrated laser emitting device so as to introduce the zeroth order diffracted lights of the wavelengths $\lambda 1$ (405 nm) and $\lambda 2$ (660 nm) and first or higher order diffracted light of the wavelength $\lambda 3$ (785 nm) to the common light detector. In this case, however, there is a problem that, in order to manufacture a diffraction grating capable of efficiently obtaining the zeroth order diffracted lights of the wavelengths $\lambda 1$ and $\lambda 2$, it becomes necessary that the diffraction grating has deep grooves and it becomes hard to manufacture the diffraction grating.

The present invention is intended to solve the above described problems, and an object of the present invention is to enable the detection of three kinds of return lights reflected by an optical recording medium using a common light detector, in order to perform recording, reproducing or the like on a plurality of kinds of optical recording media (for example, DVD, CD and an optical disk for blue-violet laser) for which lights of different wavelengths are used.

Further, an object of the present invention is to provide an optical disk device configured to have the above described optical pickup device.

Means of Solving the Problems

An optical pickup device according to the present invention includes an optical pickup device including a laser emitting device including a first light emitting portion that emits light of a first wavelength, a second light emitting portion that emits light of a second wavelength, and a third light emitting portion that emits light of a third wavelength, wherein a light emitting position of said first light emitting portion and a light emitting position of said third light emitting portion are approximately on the same position as seen in a direction of an optical axis of emitted light, a light detector, and an optical axis adjusting element for adjusting an optical axis of return light of at least one of the wavelengths among return lights of said first, second and third wavelengths so that respective return lights emitted by said first, second and third light emitting portions of said laser emitting device and reflected by an optical recording medium are received by said light detector.

EFFECT OF THE INVENTION

In the optical pickup device according to the present invention, the lights of the first and third wavelengths emitted by the first and third light emitting portions are introduced to an optical recording medium via approximately the same light path, and the light of the second wavelength emitted by the second light emitting portion is introduced to the optical recording medium via a light path slightly distanced from the light path of the lights of the first and third wavelengths. Among the return lights of the first, second and third wavelengths reflected by the optical recording medium, the optical axis of the return light of at least one of the wavelengths is adjusted by the optical axis adjusting element, and the respective return lights are received by the common light detector. Since three kinds of return lights reflected by the optical recording medium can be detected by the common light detector, the reduction in size and cost of the optical pickup device (and the optical disk device using the optical pickup device) can be accomplished.

DESCRIPTION OF REFERENCE MARKS 1, 2, 3, 7, 8 . . . semiconductor substrate, 4, 5, 6 . . . light emitting portion, 9 . . . laser emitting device, 10 . . . grating, 11 . . . prism, 12 . . . mirror, 13 . . . collimator lens, 14 . . . wavelength plate, 15 . . . objective lens, 16 . . . optical disk, 17 . . . sensor lens, 18 . . . optical axis adjusting element, 19 . . . diffraction grating, 19a . . . diffraction surface of diffraction grating, 20 . . . light detector, 100 . . . optical pickup device, 101 . . . control circuit.

BEST MODE FOR CARRYING OUT THE INVENTION

Embodiment 1

Figure 1:
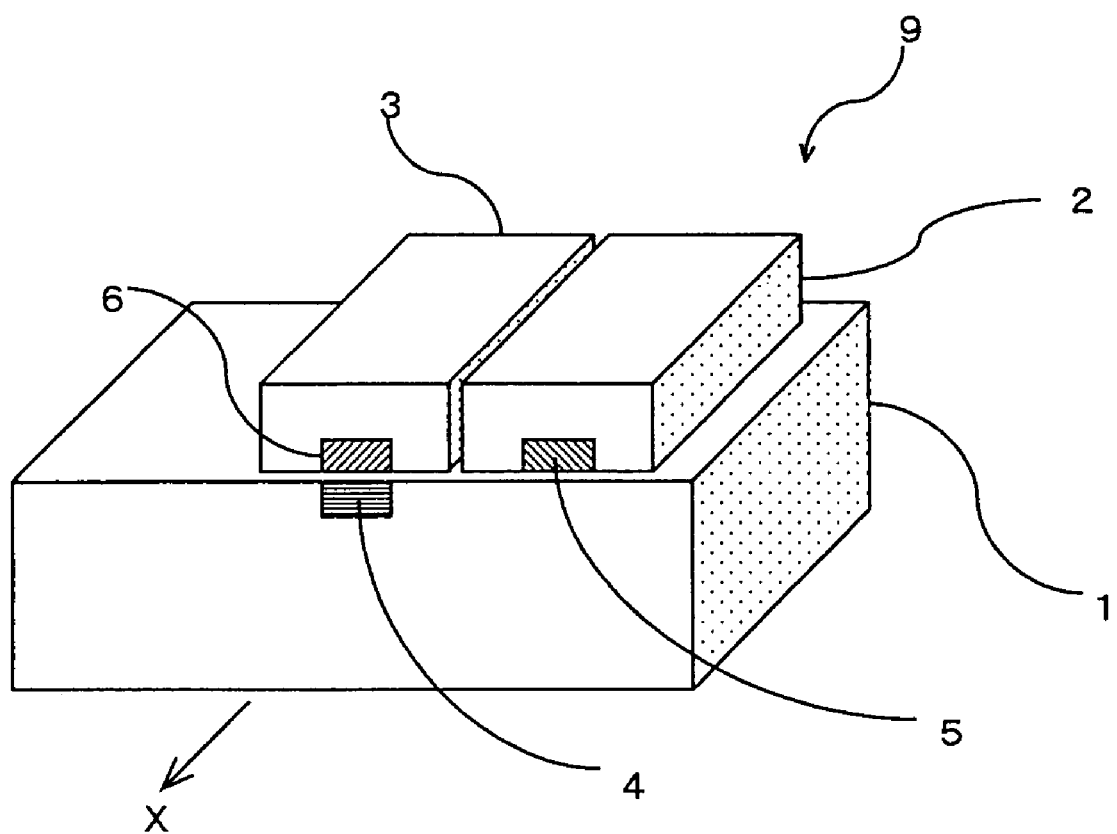
FIG. 1 is a perspective view showing a laser emitting device according to Embodiment 1 of the present invention.

FIG. 1 is a perspective view showing a three-wavelength integrated laser emitting device of an optical pickup device according to Embodiment 1 of the present invention in an enlarged scale. The optical pickup device according to Embodiment 1 is configured to perform recording, reproducing or the like (recording, reproducing or both) on DVD and CD, i.e., conventional optical recording media, and on an optical recording medium for blue-violet laser having the capacity several times that of the conventional optical recording medium.

The optical pickup device includes a three-wavelength integrated laser emitting device 9 (hereinafter, simply referred to as a laser emitting device 9) shown in FIG. 1 as a light source. The laser emitting device 9 includes three semiconductor substrates 1, 2 and 3 combined to form a package. Light emitting portions 4, 5 and 6 respectively composed of laser diodes are formed on the respective semiconductor substrates 1, 2 and 3. The light emitting portions 4, 5 and 6 are respectively configured to emit the lights of the wavelengths $\lambda 1$ (approximately 405 nm), the wavelength $\lambda 2$ (approximately 650 nm) and the wavelength $\lambda 3$ (approximately 780 nm) in accordance with the applied voltages. The laser emitting device 9 is configured to emit the light of one of the wavelengths $\lambda 1$, $\lambda 2$ and $\lambda 3$ by applying voltage to one of the light emitting portions 4, 5 and 6.

To be more specific, the laser emitting device 9 includes a semiconductor substrate 2 that emits the light of the wavelength $\lambda 2$ and a semiconductor substrate 3 that emits the light of the wavelength $\lambda 3$ both of which are bonded (adjacent to each other) onto a semiconductor substrate 1 that emits the light of the wavelength $\lambda 1$. The bonding positions of the semiconductor substrates 2 and 3 are so determined that the light emitting portion 4 that emits the light of the wavelength $\lambda 1$ and the light emitting portion 6 that emits the light of the wavelength $\lambda 3$ are approximately the same as each other, as seen in the direction of the optical axis (indicated by mark X) of the emitted light of the laser emitting device 9. In contrast, the light emitting portion 5 that emits the light of the wavelength $\lambda 2$ is disposed slightly apart from the light emitting portions 4 and 6 that emit the lights of the wavelengths $\lambda 1$ and $\lambda 3$ because of spatial limitation (because of the presence of the semiconductor substrate 3). The distance from the light emitting portions 4 and 6 to the light emitting portion 5 is, for example, 110 μm.

Figure 2:
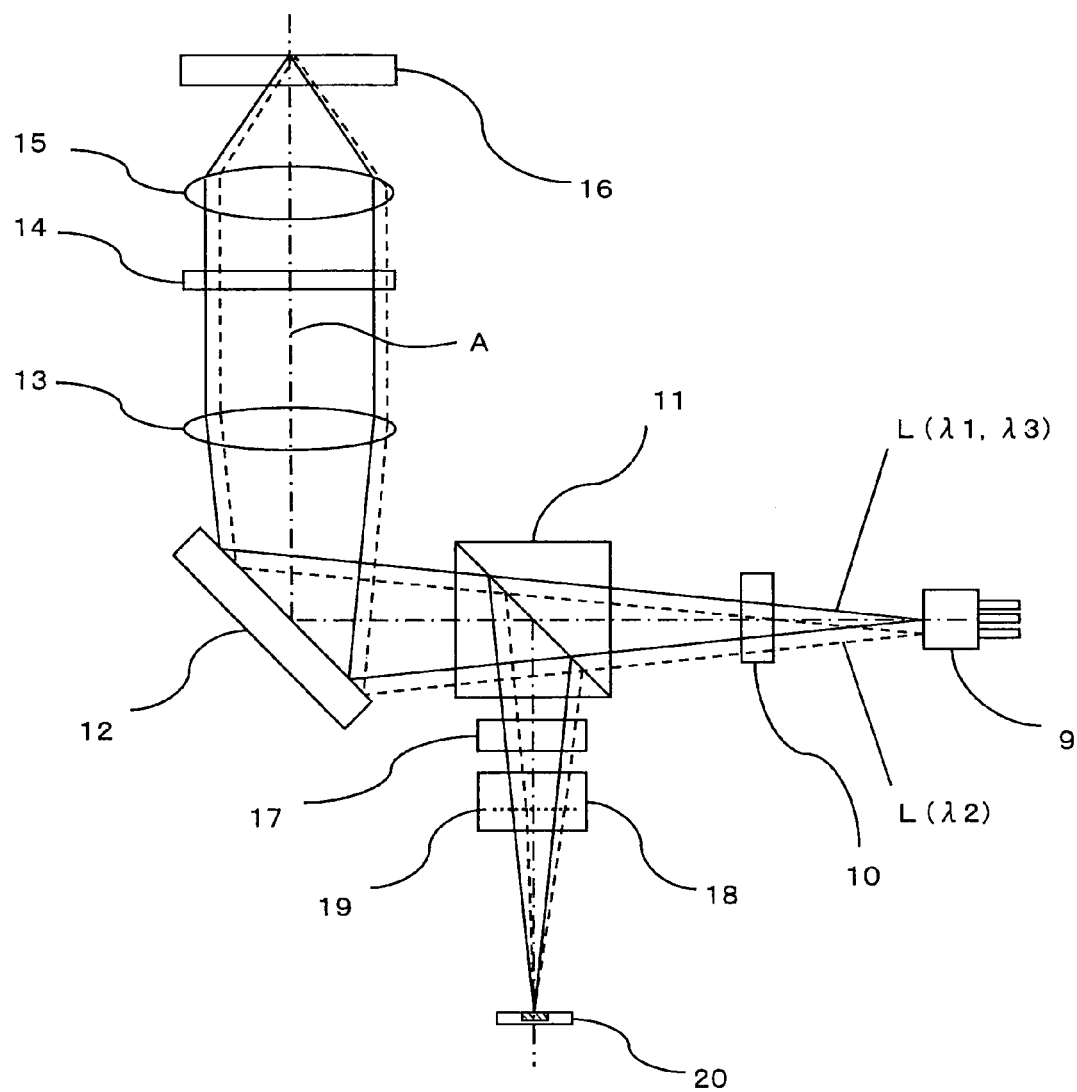
FIG. 2 is a view showing light paths of an optical pickup device according to Embodiment 1 of the present invention.
Figure 3:
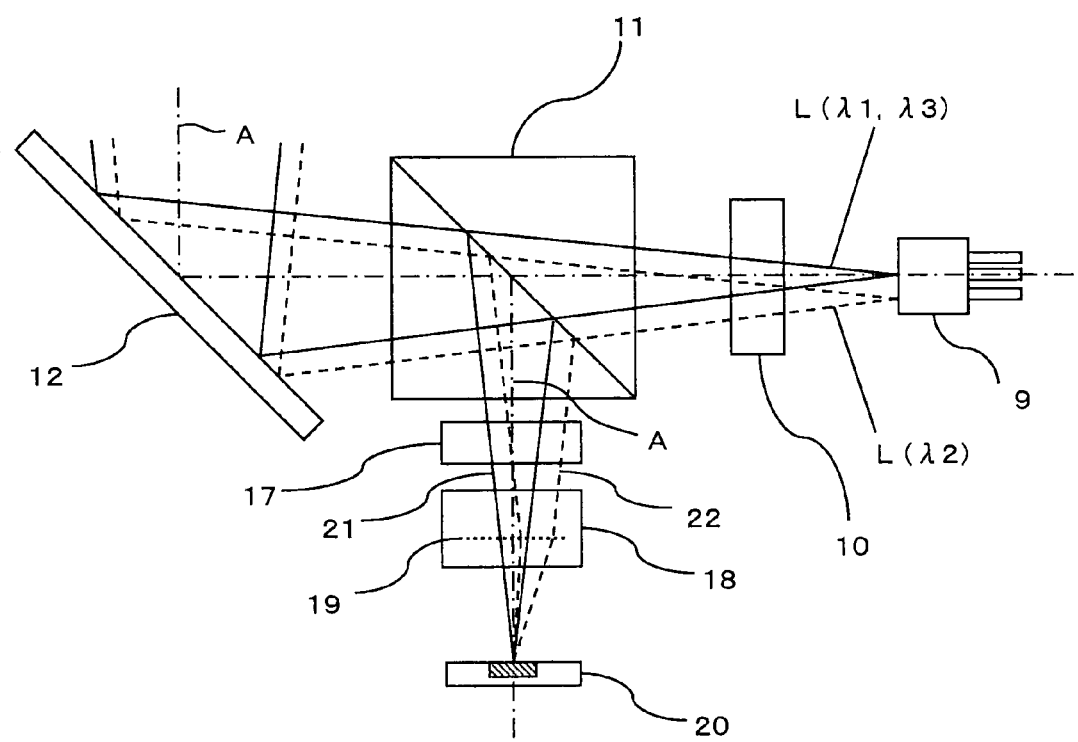
FIG. 3 is an enlarged view showing the laser emitting device and a light detector of the optical pickup device according to Embodiment 1 of the present invention.

FIG. 2 is a view showing an optical system of an optical pickup device according to Embodiment 1. FIG. 3 is an enlarged view showing a part of the optical system of an optical pickup device according to Embodiment 1. In FIGS. 2 and 3, the light paths of the lights of the respective wavelengths emitted by the laser emitting device 9 are indicated by mark L. As shown in FIG. 2, the optical pickup device includes a grating lens 10 on which the emitted light from the laser emitting device 9 is incident. The grating lens 10 is provided for generating a sub-beam required for the detection of tracking error signal (a three-beam method, a differential push-pull method or the like) generally performed in an optical pickup device.

The optical pickup device further includes a prism 11 on which the light having passed through the grating lens 10 is incident. The prism 11 has a function as a polarization beam splitter switching between reflection and transmission in accordance with the polarization direction of the incident light. The prism 11 transmits the light emitted by the laser emitting device 9 and having passed through the grating lens 10 (i.e., an approaching light).

The optical pickup device further includes a mirror 12 that reflects the light having passed through the prism 11, a collimator lens 13 on which the light reflected by the mirror 12 is incident, and a wavelength plate 14 on which the light having passed through the collimator lens 13 is incident. The collimator lens 13 converts the incident light into parallel light. The wavelength plate 14 is a so-called quarter wavelength ($\lambda/4$) plate having a function to convert a linear polarization into a circular polarization. The light having passed through the wavelength plate 14 is incident on an objective lens 15 and is focused on a signal recording surface of an optical disk 16 (DVD, CD or an optical disk for blue-violet laser).

The light focused on the signal recording surface of the optical disk 16 is modulated in accordance with the information signal recorded on the signal recording surface, and is reflected as the return light. The return light passes through the objective lens 15 to become parallel light again, and is incident on the wavelength plate 14. The wavelength plate 14 converts the circular polarization into the linear polarization, and the polarization direction is different from that of the approaching light by 90 degrees. The return light having passed through the wavelength plate 14 further passes through the collimator lens 13 to become converging light, is reflected by the mirror 12, and is incident on the prism 11.

As shown in FIG. 3, the prism 11 reflects (deflects by 90 degrees) the return light whose polarization direction is different form that of the approaching light due to the polarization dependency, and introduces the return light to a sensor lens 17. The sensor lens 17 is configured to impart astigmatism (required for the detection of the focus error signal as generally performed in an optical pickup device) to the return light. The light having passed through the sensor lens 17 is incident on the optical axis adjusting element 18.

The optical axis adjusting element 18 has a function to change the direction of the optical axis of the return light of at least one wavelength among the return lights of the three kinds of wavelengths $\lambda 1$, $\lambda 2$ and $\lambda 3$. To be more specific, due to the diffraction action of a diffraction grating 19 provided on the optical axis adjusting element 18, the optical axis adjusting element 18 changes the direction of the optical axis of the return light of the wavelength $\lambda 2$ so that the return lights of the wavelengths $\lambda 1$, $\lambda 2$ and $\lambda 3$ are received by a common light detector 20.

The return lights of the wavelengths $\lambda 1$ and $\lambda 3$ proceed in such a manner that the respective optical axes are approximately aligned with the optical axis (a system optical axis of the optical pickup device: shown by mark A in FIGS. 2 and 3) passing through the centers of the collimator lens 13 and the objective lens 15, proceed through the optical axis adjusting element 18, and are incident on the light detector 20. In contrast, since the light emitting portion 5 (FIG. 1) of the semiconductor substrate 2 that emits the light of the wavelength $\lambda 2$ is disposed slightly apart from the light emitting portions 4 and 6 (FIG. 1) of the wavelengths λ1 and λ3, the return light of the wavelength λ2 is incident on the optical axis adjusting element 18 in such a manner that the optical axis thereof is shifted from the system optical axis A, diffracted by the binary-blazed diffraction grating 19 provided on the optical axis adjusting element 18, and is incident on the light detector 20. In other words, the return light of the wavelengths λ1, λ2 and λ3 can be received by the light detector 20, where the signal detection is performed.

Figure 4:
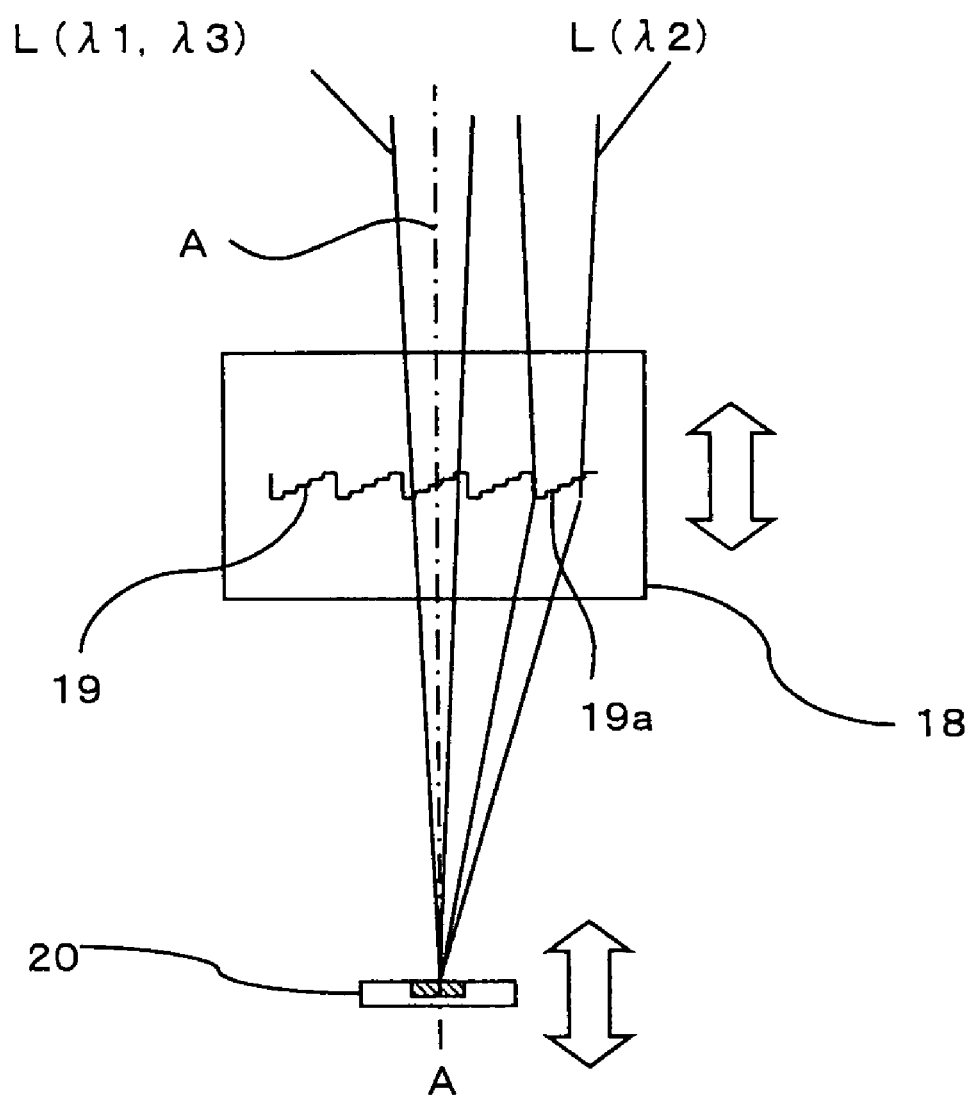
FIG. 4 is a view for illustrating the diffraction at an optical axis adjusting element according to Embodiment 1 of the present invention.
Figure 5:
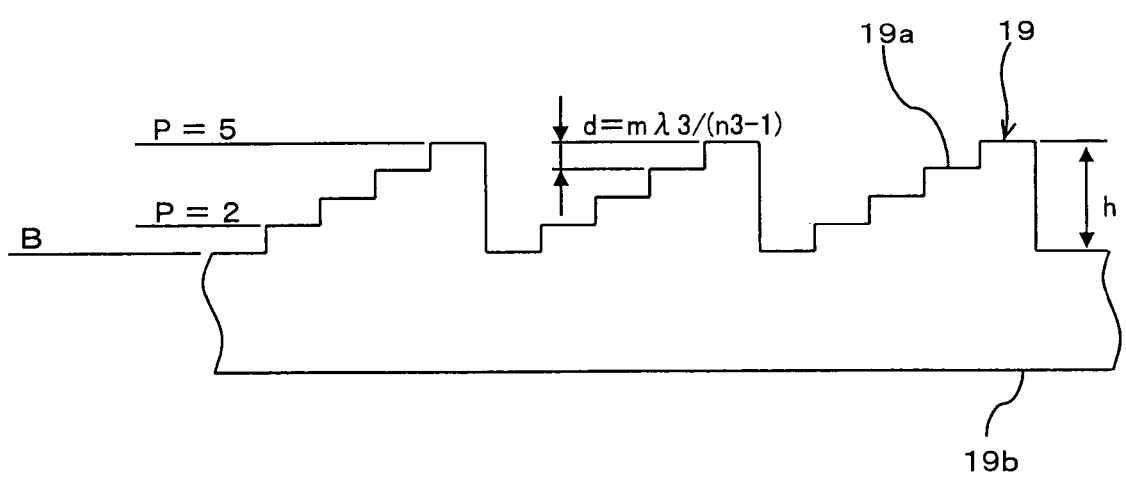
FIG. 5 is an illustrative view of a binary-blazed diffraction grating according to Embodiment 1 of the present invention.

Next, the function and the configuration of the binary-blazed diffraction grating 19 of the optical axis adjusting element 18 will be described. FIG. 4 is a view for illustrating the function of the binary glazed diffraction grating 19 provided on the optical axis adjusting element 18 according to Embodiment 1. FIG. 5 is a view showing the configuration of the binary-blazed diffraction grating 19. In FIG. 4, the light paths of the lights of the respective wavelengths incident on the light detector 20 are shown by mark L.

As shown in FIG. 5, the binary-blazed diffraction grating 19 has a blazed grating surface formed in a step-like fashion on an incident surface or an exit surfaces (in this example, the exit surface) thereof. The step-like grating surface 19a is formed to have five steps including a grating bottom surface (shown by mark B), a second step (P=2), a third step (P=3), a fourth step (P=4) and a fifth step (P=5). The height (depth) of each step of the diffraction grating 19 is referred to as a level difference d. Further, the number of steps (including the grating bottom surface) of the diffraction grating 19 is referred to as the number of levels P. Furthermore, the distance from the grating bottom surface B to the grating surface of the uppermost step (in this example, P=5) is referred to as a groove depth h.

As shown in FIG. 4, the return lights of the wavelengths λ1 and λ3 proceed along approximately the same light path, and are perpendicularly incident on the incident surface 19b (FIG. 5) of the binary-blazed diffraction grating 19 (hereinafter, simply referred to as the diffraction grating 19). Then, the zeroth order diffracted light (whose diffraction angle is 0 degree) is emitted through the grating surface 19a (FIG. 5) of the diffraction grating 19. The zeroth order diffracted lights of the return lights of the wavelengths λ1 and λ3 are perpendicularly incident on the detection surface of the light detector 20 at the same position.

In contrast, the return light of the wavelength λ2 proceeds along the light path shifted from the light path of the return lights of the wavelengths λ1 and λ3, and is incident on the incident surface 19b (FIG. 5) of the diffraction grating 19 at a certain incident angle. Then, the first order diffracted light is emitted from the grating surface 19a (FIG. 5) of the diffraction grating 19.

The first order diffracted light of the return light of the wavelength λ2 is incident on the light detector 20 at a certain incident angle (different from the incident angle thereof on the diffraction grating 19).

With such a configuration, by moving the optical axis adjusting element 18 and the light detector 20 in the direction of the optical axis of the incident light (the direction of the optical axis A of the return lights of the wavelengths λ1 and λ3), it is possible to adjust the receiving position of the return light of the wavelength λ2 on the detection surface (a surface perpendicular to the optical axis of the incident light) of the light detector 20. Regarding the return lights of the wavelengths λ1 and λ3, the zeroth order diffracted lights thereof are utilized, and therefore the receiving positions thereof on the light detector 20 do not change even when the optical axis adjusting element 18 and the light detector 20 are moved in the direction of the optical axis. As a result, it is possible to align the receiving position of the return light of the wavelength λ2 with the receiving positions of the return lights of the wavelengths λ1 and λ3.

Here, when the refractive index of the material of the diffraction grating 19 at the wavelength λ3 is expressed as n3, and m represents an integer number greater than or equal to 1, the level difference d shown in FIG. 5 is expressed as:

$$d \approx m\lambda 3/(n3-1) \quad (1)$$

When the wavelength λ1 is 405 nm, the wavelength λ3 is 780 nm, and the order m is 1, and when the refractive index is determined based on data corresponding to BK7 (a general glass material), the level difference d is approximately 1.53 μm based on the equation (1). On this basis, the level difference d of the diffraction grating 19 is set to 1.53 μm in this embodiment.

In the binary-blazed diffraction grating 19, when the level difference d is an integral multiple of λ/(n−1), the difference in light path length (due to the level difference d) is an integral multiple of the wavelength λ, and therefore the highest zeroth order diffraction efficiency can be obtained. When the wavelength λ1 is 405 nm and the wavelength λ3 is 780 nm, the ratio of wavelengths is approximately 1.92, which is close to 2. Therefore, when the level difference d is so set that the difference in light path length is an integral multiple of the wavelength λ3, the difference in light path length is also nearly an integral multiple of the wavelength λ1. Therefore, the high zeroth order diffraction efficiencies at both of the wavelengths λ1 and λ3 can be obtained.

Further, in general, the refractive index of the material such as glass or plastic becomes slightly larger, as the wavelength becomes shorter. For example, in the case of BK7 (a general glass material), n=1.53 at the wavelength of 405 nm, and n=1.51 at the wavelength of 780 nm. When the calculation is performed using the data of refractive index corresponding to BK7 (a general glass material) as the material of the diffraction grating 19, the ratio of λ3/(n3−1) to λ1/(n1−1) is 1.99. Therefore, when the level difference d of the diffraction grating 19 is set to an integral multiple of λ3/(n3−1) so that the highest zeroth order diffraction efficiency at the wavelength λ3 can be obtained, the level difference becomes close to an integral multiple of λ1/(n1−1) with which the highest zeroth order diffraction efficiency at the wavelength λ1 can be obtained. Therefore, the high zeroth order diffraction efficiencies at both of the wavelengths λ1 and λ3 can be obtained.

The diffraction efficiencies of the respective return lights are calculated while using the data of refractive index corresponding to BK7 (a general glass material), setting the number of levels P=2 (with which the structure becomes the simplest), and varying the level difference d of the diffraction grating 19 (d=h when the number of levels is 2). The diffraction efficiencies change in sign curves, and the zeroth order diffraction efficiencies show almost the maximums at both of the wavelengths λ1 and λ3 when the level difference d is 1.53 μm.

As described above, the number of levels P of the diffraction grating 19 means the number of steps of the step-like diffraction grating 19 (including the grating bottom surface), and the number of levels P is 5 (P=5) in the example shown in FIG. 5. In the diffraction grating 19, the highest diffraction efficiencies (that can be obtained) are different based on the number of levels P.

FIGS. 6 through 12 show the relationship between the groove depth h and the calculated values of the diffraction efficiencies of the respective return lights when the number of levels P of the diffraction grating 19 is varied as 2, 3, 4, 5, 6, 7 and 8 (seven ways). In the calculation, the data of refractive index of BK7 (a general glass material) is used.

Figure 6:
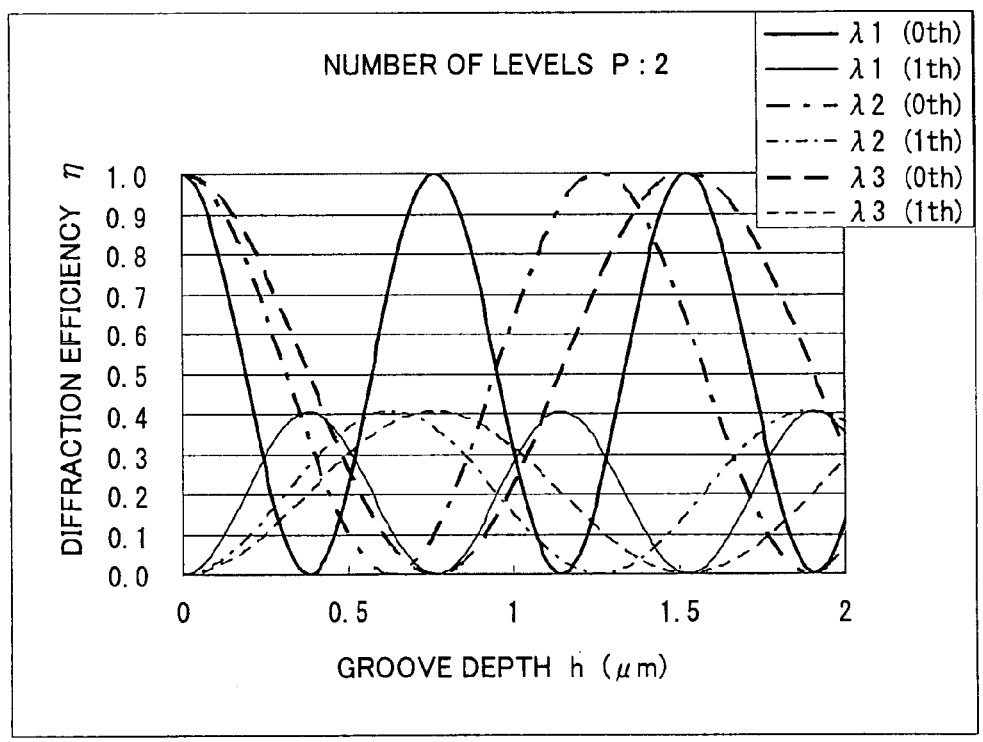
FIG. 6 is a graph showing the diffraction efficiency of the binary-blazed diffraction grating whose number of levels is 2 according to Embodiment 1 of the present invention.

As shown in FIG. 6, in the case where the number of levels P is 2, the zeroth order diffraction efficiencies at the wavelengths λ1 and λ3 show almost their maximums when the groove depth h is approximately 1.5 μm. On this condition (h=1.5 μm), the first order diffraction efficiency η at the wavelength λ2 is 0.15.

Figure 7:
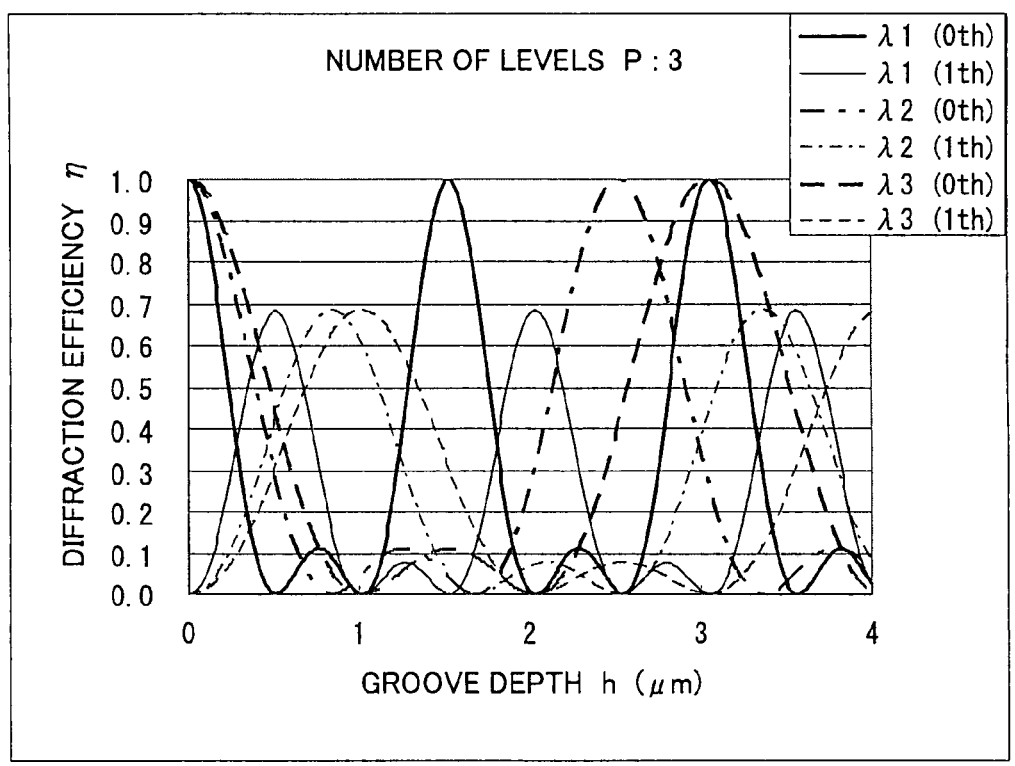
FIG. 7 is a graph showing the diffraction efficiency of the binary-blazed diffraction grating whose number of levels is 3 according to Embodiment 1 of the present invention.

As shown in FIG. 7, in the case where the number of levels P is 3, the zeroth order diffraction efficiencies at the wavelengths λ1 and λ3 show almost their maximums when the groove depth h is approximately 3.1 μm. On this condition (h=3.1 μm), the first order diffraction efficiency η at the wavelength λ2 is 0.44.

Figure 8:
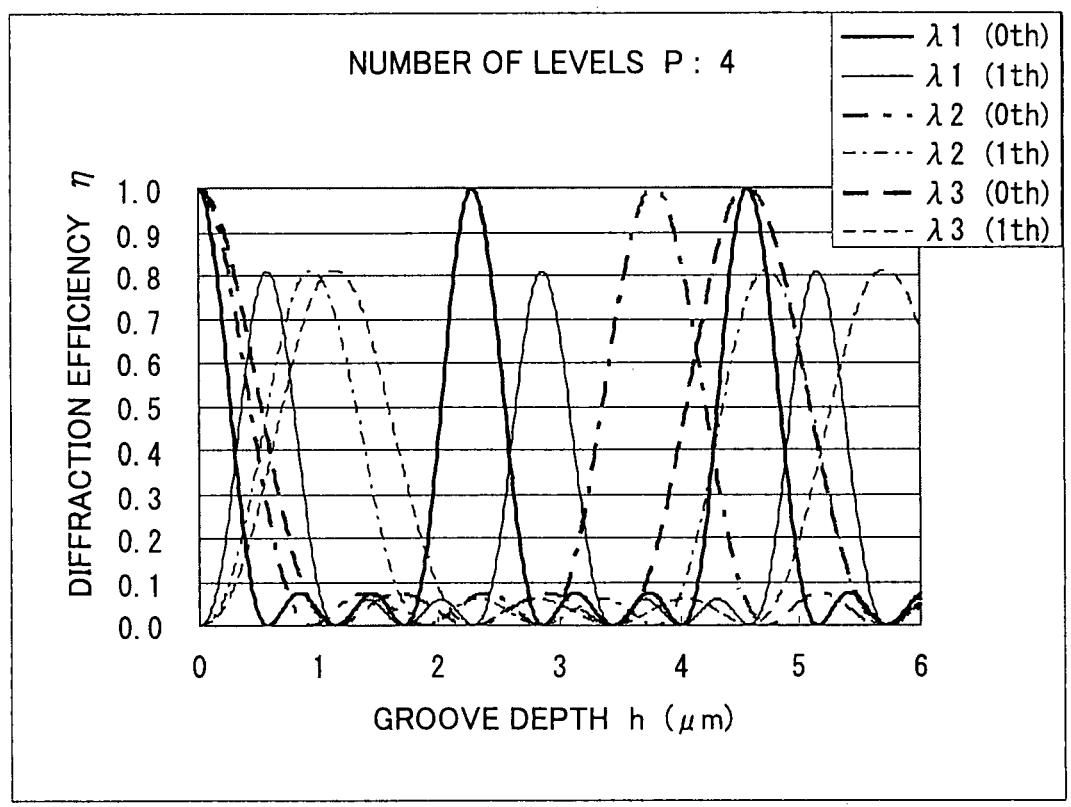
FIG. 8 is a graph showing the diffraction efficiency of the binary-blazed diffraction grating whose number of levels is 4 according to Embodiment 1 of the present invention.

As shown in FIG. 8, in the case where the number of levels P is 4, the zeroth order diffraction efficiencies at the wavelengths λ1 and λ3 show almost their maximums when the groove depth h is approximately 4.6 μm. On this condition (h=4.6 μm), the first order diffraction efficiency η at the wavelength λ2 is 0.74.

Figure 9:
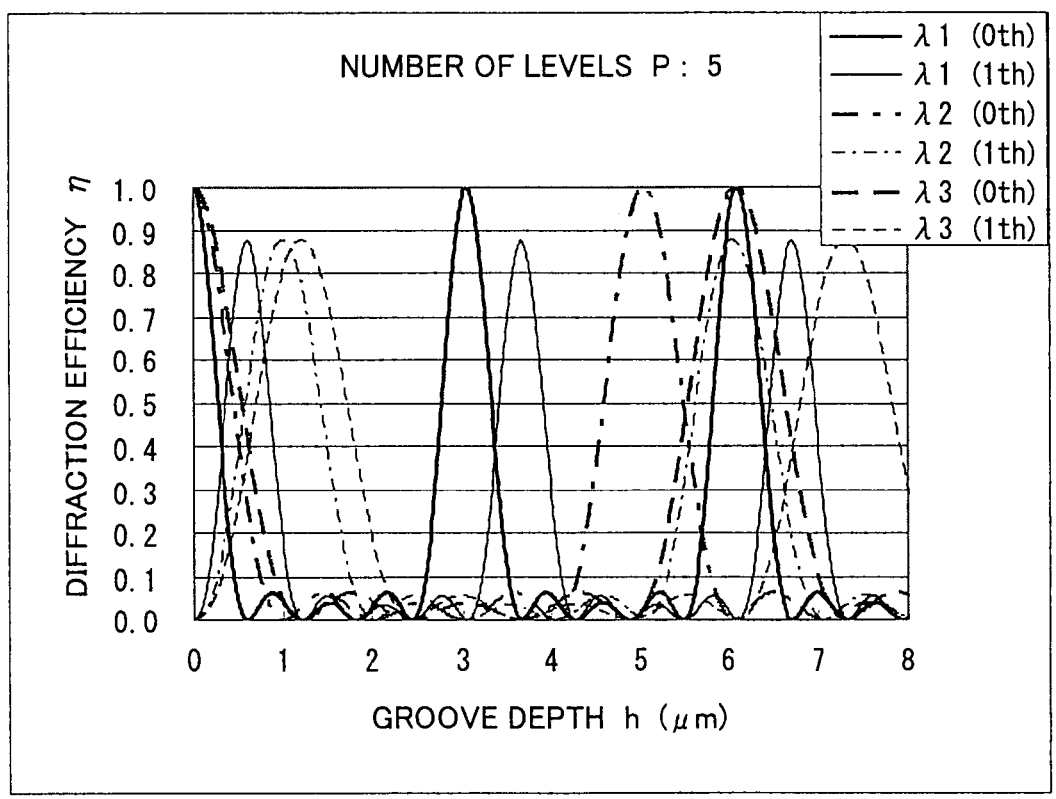
FIG. 9 is a graph showing the diffraction efficiency of the binary-blazed diffraction grating whose number of levels is 5 according to Embodiment 1 of the present invention.

As shown in FIG. 9, in the case where the number of levels P is 5, the zeroth order diffraction efficiencies at the wavelengths λ1 and λ3 show almost their maximums when the groove depth h is approximately 6.1 μm. On this condition (h=6.1 μm), the first order diffraction efficiency η at the wavelength λ2 is 0.87.

Figure 10:
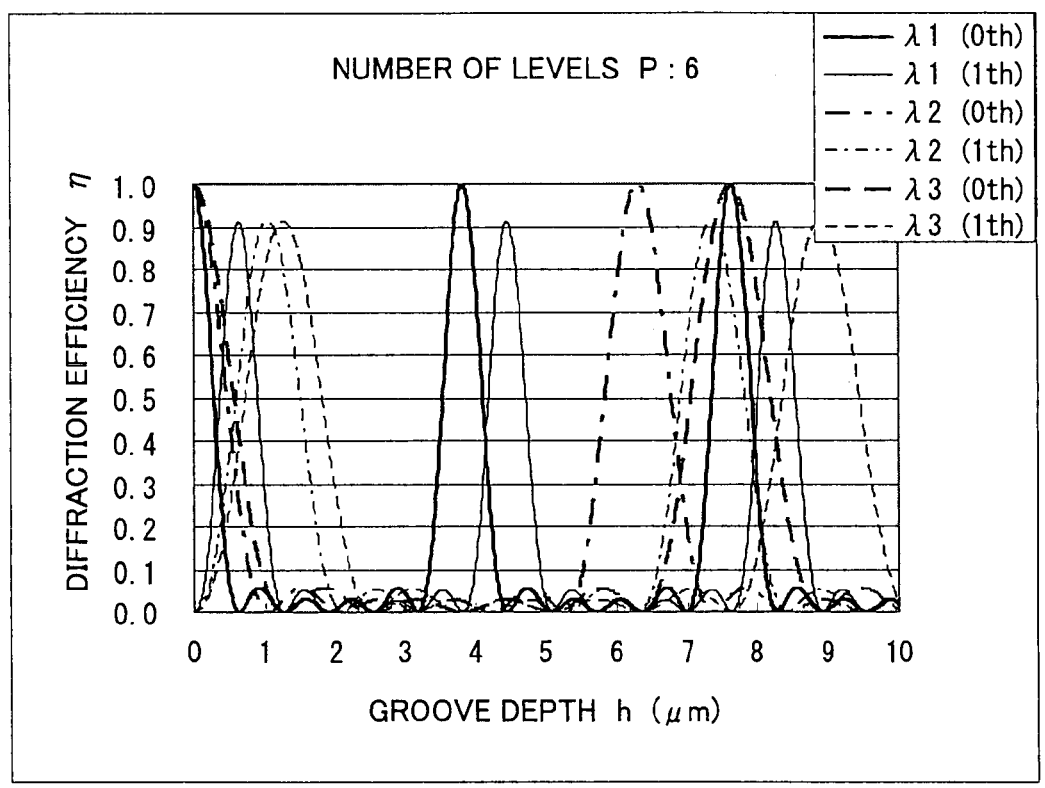
FIG. 10 is a graph showing the diffraction efficiency of the binary-blazed diffraction grating whose number of levels is 6 according to Embodiment 1 of the present invention.

As shown in FIG. 10, in the case where the number of levels P is 6, the zeroth order diffraction efficiencies at the wavelengths λ1 and λ3 show almost their maximums when the groove depth h is approximately 7.6 μm. On this condition (h=7.6 μm), the first order diffraction efficiency η at the wavelength λ2 is 0.75.

Figure 11:
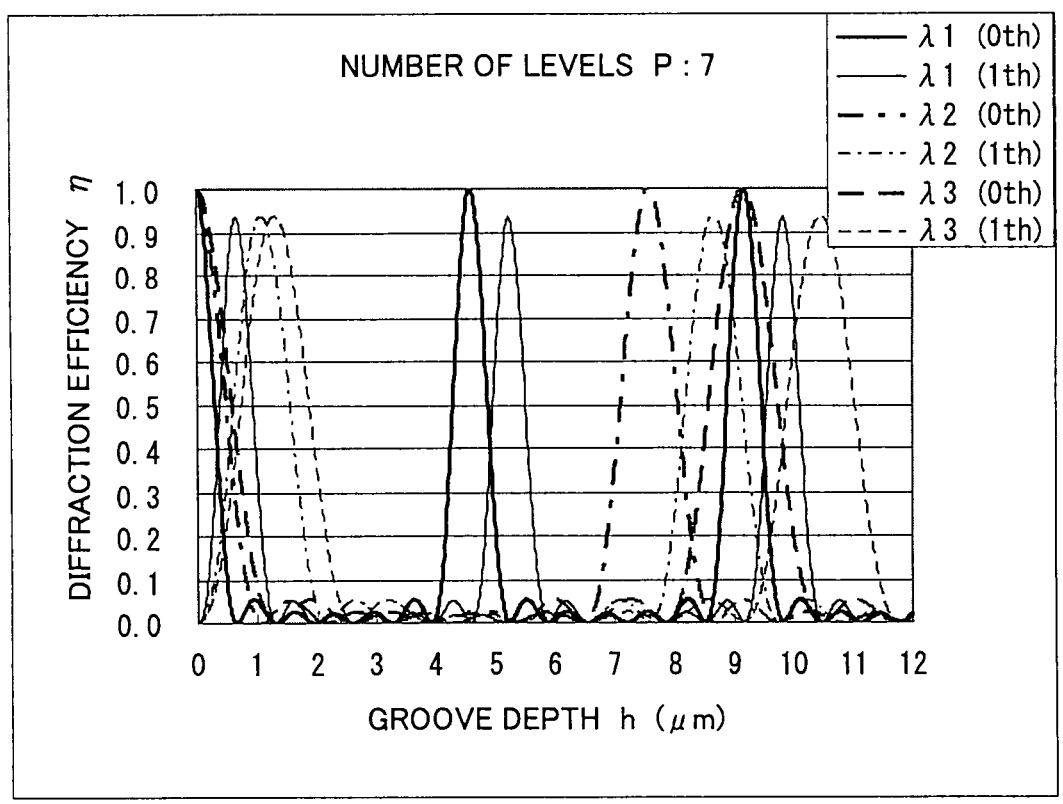
FIG. 11 is a graph showing the diffraction efficiency of the binary-blazed diffraction grating whose number of levels is 7 according to Embodiment 1 of the present invention.

As shown in FIG. 11, in the case where the number of levels P is 7, the zeroth order diffraction efficiencies at the wavelengths λ1 and λ3 show almost their maximums when the groove depth h is approximately 9.2 μm. On this condition (h=9.2 μm), the first order diffraction efficiency η at the wavelength λ2 is 0.45.

Figure 12:
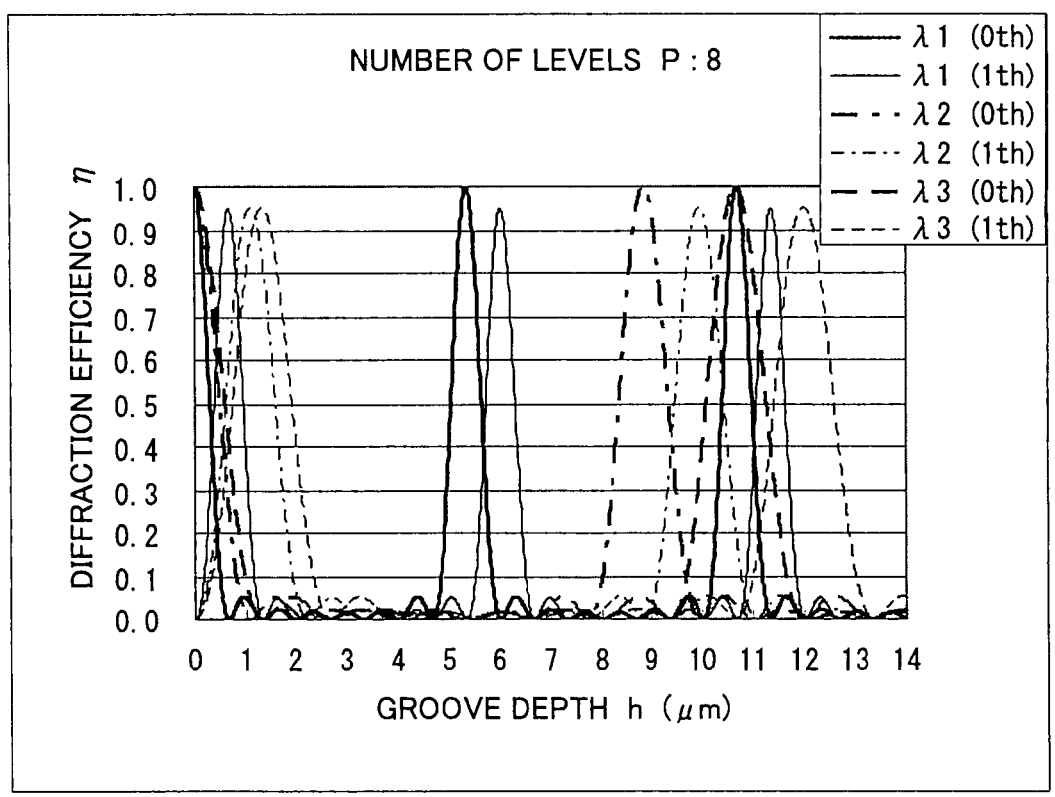
FIG. 12 is a graph showing the diffraction efficiency of the binary-blazed diffraction grating whose number of levels is 8 according to Embodiment 1 of the present invention.

As shown in FIG. 12, in the case where the number of levels P is 8, the zeroth order diffraction efficiencies at the wavelengths λ1 and λ3 show almost their maximums when the groove depth h is approximately 10.7 μm. On this condition (h=10.7 μm), the first order diffraction efficiency η at the wavelength λ2 is 0.17.

Figure 13:
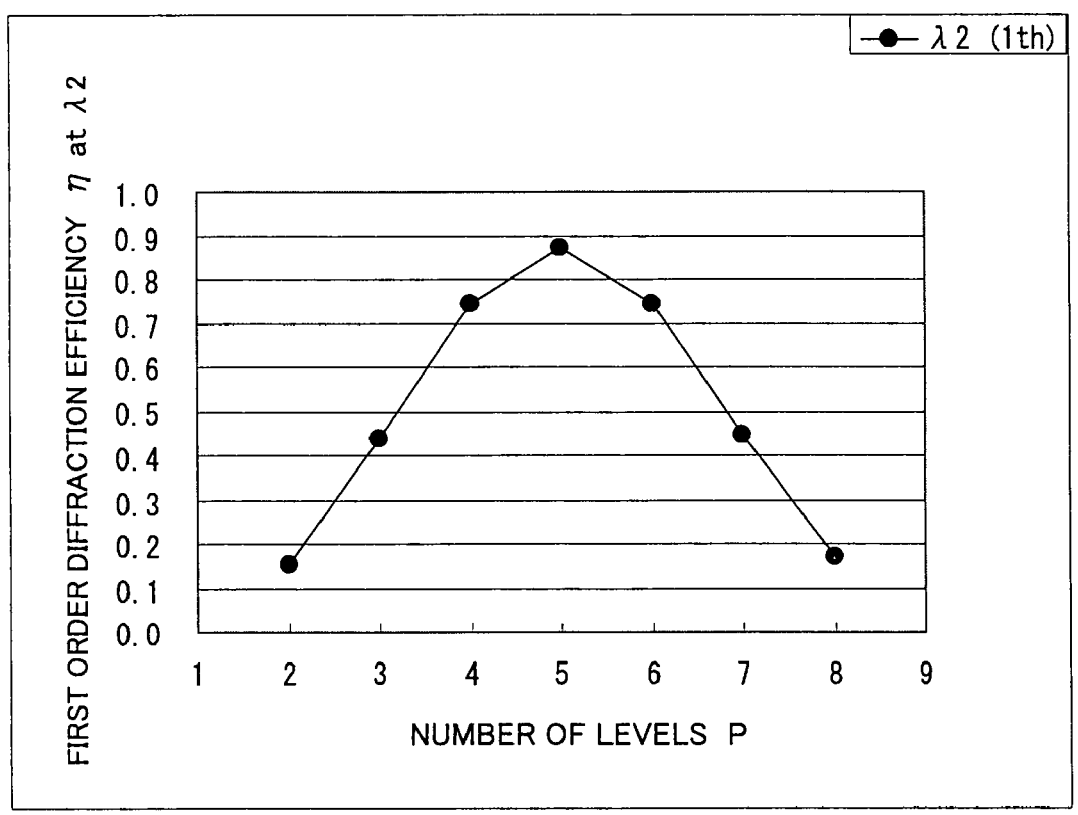
FIG. 13 is a graph showing the first order diffraction efficiencies at respective number of levels at the wavelength $\lambda 2$ according to Embodiment 1 of the present invention.

FIG. 13 is a graph showing the relationship between the number of levels P and the first order diffraction efficiency at the wavelength λ2 when the zeroth order diffraction efficiency at the wavelengths λ1 and λ3 show almost their maximums.

Generally, the detection of the signal becomes easier, as the amount of light received by the light detector 20 increases. In this embodiment, the number of levels P is set to 5, so that a high first order diffraction efficiency at the wavelength λ2 (when the zeroth order diffraction efficiencies of the wavelengths λ1 and λ3 show their maximums) is obtained. Therefore, it becomes possible to detect the signal of the return light of the wavelength λ2, as well as the return lights of the wavelengths λ1 and λ3.

As described above, according to this embodiment, the optical axis of the return light of at least one wavelength (in this example, the wavelength λ2) among the return lights of the wavelengths λ1, λ2 and λ3 reflected by the optical recording medium is adjusted by the optical axis adjusting element 18, with the result that the return lights of the respective wavelengths can be detected by the common light detector 20.

With such a configuration, the reduction in size and cost of the optical pickup device (and the optical disk device using the optical pickup device) can be accomplished.

Further, in this embodiment, the zeroth order diffracted lights of the wavelengths λ1 and λ3 are introduced to the light detector 20, and therefore it becomes possible to move the diffraction grating 19 and the light detector 20 in the direction of the optical axis of the incident light, without changing the receiving position of the return lights of the wavelengths λ1 and λ3 on the light detector 20. Accordingly, with the moving adjustment of the diffraction grating 19 and the light detector 20, the receiving position of the return light of the wavelength λ2 can be aligned with the receiving position of the return lights of the wavelengths λ1 and λ3 on the light detector 20. With such a configuration, the optical axis adjustment for introducing the return lights of the wavelengths λ1, λ2 and λ3 to the common light detector 20 can be performed in a simple manner.

Furthermore, this embodiment utilizes the zeroth order diffracted lights of the wavelengths xl (approximately 405 nm) and λ3 (approximately 780 nm). In this regard, as shown in FIGS. 6 through 12, the zeroth order diffracted light can be obtained at high efficiency, without increasing the groove depth h of the diffraction grating 19. Therefore, it becomes possible to easily manufacture the diffraction grating 19 with which the zeroth order diffracted lights of the wavelengths λ1 and λ3 can be obtained at high efficiency.

Further, in the binary-blazed diffraction grating, when the level difference d is an integral multiple of $\lambda/(n-1)$, the difference in the light path length due to the level difference d is an integral multiple of the wavelength λ, so that the highest zeroth order diffraction efficiency can be obtained. In this embodiment, the level difference d of the diffraction grating 19 is set to satisfy $d \approx m\, \lambda3/(n3-1)$, where n3 is a refractive index of the diffraction grating at the wavelength λ3, and m is an integer number greater than or equal to 1. Therefore, the highest zeroth order diffraction efficiency at the wavelength λ3 can be obtained. When the wavelength λ1 is set to 405 nm and the wavelength λ3 is set to 780 nm, the ratio of the wavelengths is approximately 1.92, which is close to 2. Therefore, when the level difference d is so set that the difference in the light path length is an integral multiple of the wavelength λ3, the difference in the light path length is also nearly an integral multiple of the wavelength λ1. Therefore, the high zeroth order diffraction efficiencies can be obtained at both of the wavelengths λ1 and λ3. As a result, it becomes possible to excellently detect the signal from the return lights of the wavelengths λ1 and λ3.

Embodiment 2

Figure 14:
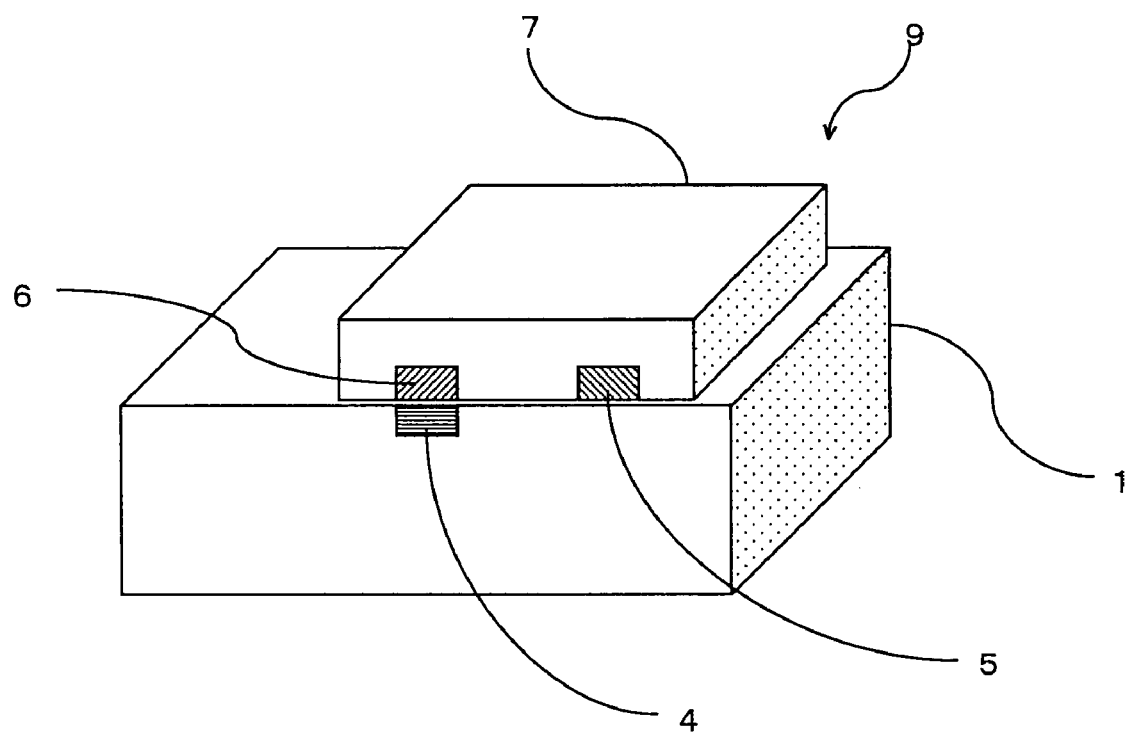
FIG. 14 is a perspective view showing a laser emitting device according to Embodiment 2 of the present invention.

FIG. 14 is a perspective view showing a configuration of a three-wavelength integrated laser emitting device 9 (hereinafter, simply referred to as a laser emitting device 9) according to Embodiment 2 of the present invention. In this embodiment, the configuration of the laser emitting device 9 is different from the above described Embodiment 1. The components of the optical pickup device of this embodiment other than the laser emitting device 9 are the same as those of the above described Embodiment 1.

The laser emitting device 9 of this embodiment is so configured that a monolithic type semiconductor substrate 7 on which light emitting portions (laser diodes) 5 and 6 are formed is bonded onto a semiconductor substrate 1 on which a light emitting portion (a laser diode) 4 is formed, so as to form a package. The light emitting portion 4 formed on the semiconductor substrate 1 and the light emitting portions 5 and 6 formed on the semiconductor substrate 7 respectively emit the lights of the wavelengths λ1 (approximately 405 nm), λ2 (approximately 650 nm) and λ3 (approximately 780 nm) in accordance with the applied voltages. Further, the semiconductor substrates 1 and 7 are so configured that the light emitting position of the light emitting portion 4 and the light emitting position of the light emitting portion 6 are approximately the same as each other, as seen in the direction of the optical axis of the emitted light of the laser emitting device 9. The light emitting portion 5 of the monolithic type semiconductor substrate 7 is so formed that the light emitting position thereof is apart from the light emitting position of the light emitting portions 4 and 6 by, for example, 110 μm.

Figure 15:
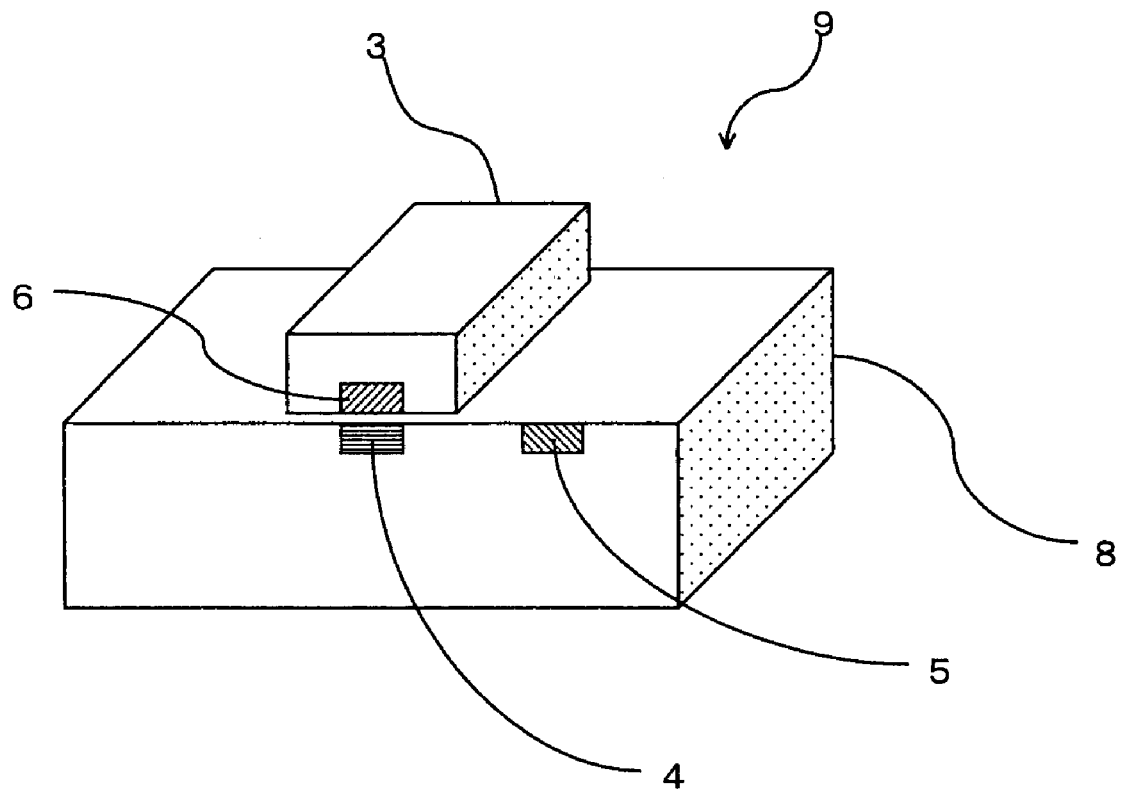
FIG. 15 is a perspective view showing another example of the laser emitting device according to Embodiment 2 of the present invention.

FIG. 15 is a perspective view showing another configuration example of the laser emitting device 9 according to Embodiment 2. The laser emitting device shown in FIG. 15 is so configured that a semiconductor substrate 3 on which a light emitting portion (a laser diode) 6 is formed is bonded onto a monolithic type semiconductor substrate 8 on which light emitting portions (laser diodes) 4 and 5 are formed, so as to form a package. The light emitting portions 4 and 5 formed on the semiconductor substrate 8 and the light emitting portion 6 formed on the semiconductor substrate 3 respectively emit the lights of the wavelengths λ1 (approximately 405 nm), λ2 (approximately 650 nm) and λ3 (approximately 780 nm) in accordance with the applied voltages. In this regard, the semiconductor substrates 8 and 3 are so configured that the light emitting position of the light emitting portion 4 and the light emitting position of the light emitting portion 6 are approximately the same as each other, as seen in the direction of the optical axis of the emitted light of the laser emitting device 9. The light emitting portion 5 of the monolithic type semiconductor substrate 8 is so formed that the light emitting position thereof is apart from the light emitting position of the light emitting portions 4 and 6 by, for example, 110 μm.

In this embodiment (FIGS. 14 and 15), the light emitting position of the light of the wavelength λ3 and the light emitting position of the light of the wavelength λ1 are approximately the same, as seen in the direction of the optical axis of the emitted light of the laser emitting device 9. Therefore, it is possible to obtain the same result as in the above described Embodiment 1.

Embodiment 3

In the above described Embodiment 1, the number of levels P of the diffraction grating 1 of the optical axis adjusting element 18 is set to 5. In this embodiment, the number of levels P of the diffraction grating 19 is set in the range from 4 to 6. The other configuration of the optical pickup device according to this embodiment is the same as the above described Embodiment 1.

The configuration of the above described diffraction grating 19 shown in FIG. 5 corresponds to that in the case where the number of levels P is set to 5 in this embodiment. When the groove depth h of the diffraction grating 19 (whose number of levels P is in the range from 2 to 8) is varied, the zeroth order diffraction efficiency and the first order diffraction efficiency at the respective wavelengths change as shown in FIGS. 6 through 12. Further, there is a relationship shown in FIG. 13 between the number of levels P and the first order diffraction efficiency at the wavelength λ2 when the zeroth order diffraction efficiencies at the wavelengths λ1 and λ3 show almost their maximums. As was described in Embodiment 1, the data of refractive index corresponding to BK7 (a general glass material) is used as the refractive index of the diffraction grating 19 in the calculation.

As shown in FIG. 13, when the number of levels P of the diffraction grating 19 is in the range from 4 to 6, the first order diffraction efficiency at the wavelength λ2 (when the zeroth order diffraction efficiencies at the wavelengths λ1 and λ3 show their maximum) is greater than or equal to the 0.7, i.e., the high first order diffraction efficiency can be obtained. Generally, as the amount of the light incident on the light detector 20 increases, the detection of the signal becomes easier. Therefore, it becomes possible to excellently detect the signal using the light detector 20 when the number of levels P of the diffraction grating 19 ranges from 4 to 6.

As described above, according to this embodiment, by using the binary-brazed diffraction grating 19 whose number of levels P is in the range from 4 to 6, it becomes possible to obtain the high diffraction efficiency of the return light of the wavelength λ2, as well as the return lights of the wavelengths λ1 and λ3. Therefore, it becomes possible to excellently detect the signal using the light detector 20.

Particularly, when the number of levels P is 4, the number of steps of the diffraction grating 19 is smaller than the case where the number of levels P is 5 or 6, and the structure becomes simpler. Therefore, there is an advantage that that the manufacturing of the diffraction grating 19 becomes easy.

Embodiment 4

In the above described Embodiment 1, the refractive index of the diffraction grating 19 of the optical axis adjusting element 18 is set equivalent to the refractive index of BK7, i.e., a general glass material. In this Embodiment, a material satisfying the following conditions is selected as the material of the diffraction grating 19. The other configuration of the optical pickup device of this embodiment is the same as the above described Embodiment 1.

In this embodiment, the material of the diffraction grating 19 is selected among materials in which the refractive index n1 at the wavelength λ1 and the refractive index n2 at the wavelength λ2 satisfy:

$$1.0 \leq (n1-1)/(n3-1) \leq 1.08 \qquad (2)$$

In the above described Embodiment 1, the wavelength λ1 is expressed as approximately 405 nm, and the wavelength λ3 is expressed as approximately 780 nm. However, the wavelengths of the emitted lights of the semiconductor laser emitting device for blue-violet and the laser emitting device for CD have certain ranges such that λ1=405±8 nm and λ3=780±15 nm, i.e., the wavelengths λ1 and λ3 are not always 405 nm and 780 nm.

As was described in Embodiment 1, the highest zeroth order diffraction efficiency can be obtained when the level difference d is an integral multiple of λ/(n−1). Therefore, the optimum level difference d at the wavelength λ1 is an integral multiple of λ1/(n1−1), and the optimum level difference d at the wavelength λ3 is an integral multiple of λ3/(n3−1). The ratio of λ3/λ1 is approximately 2. In consideration of the difference between the refractive indexes n1 and n3, the highest zeroth order diffraction efficiency is obtained when the following relationship is satisfied:

$$2\lambda 1/(n1-1) = \lambda 3/(n3-1) \qquad (3)$$

By transforming the above described equation (3), the following equation (4) is obtained:

$$(n1-1)/(n3-1) = 2\lambda 1/\lambda 3 \qquad (4)$$

By applying the above described ranges of the wavelengths of the emitted lights (λ1=405±8 nm, λ3=780±15 nm) to the equation (4), the above described equation (2) is obtained. By forming the diffraction grating 19 using the material satisfying the equation (2), it becomes possible to obtain the highest zeroth order diffraction efficiencies at both of the wavelengths λ1 and λ3 using the same level difference d. By choosing the suitable material of the diffraction grating 19 in accordance with the wavelength of the emitted light of the laser emitting device 9, it becomes possible to obtain the high diffraction efficiencies at the wavelengths λ1 and λ3.

As described above, in this embodiment, the binary-blazed diffraction grating 19 is formed of the material satisfying $1.0 \leq (n1-1)/(n3-1) \leq 1.08$, and therefore it becomes possible to obtain the high zeroth order diffraction efficiencies at both of the wavelengths λ1 and λ3, and to excellently detect the signal using the light detector 20, even when the laser emitting device emitting the light having the wavelength with a range is used.

Embodiment 5

Figure 16:
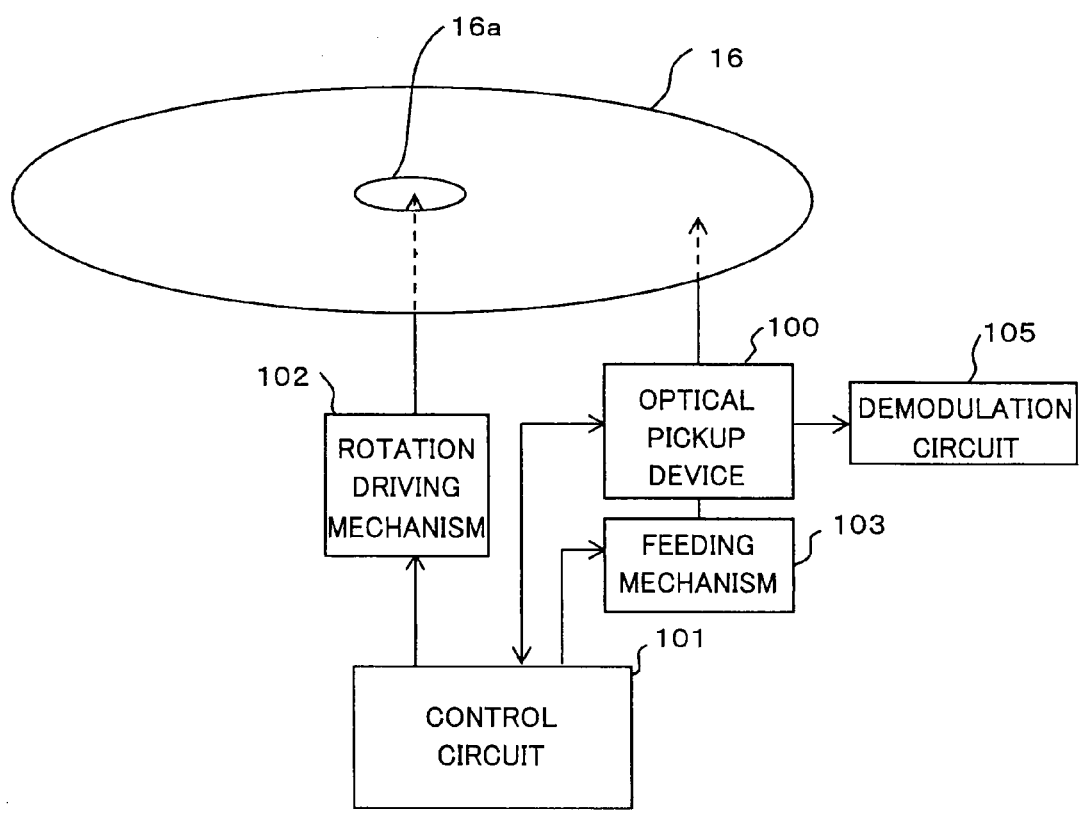
FIG. 16 is a perspective view showing a basic configuration of an optical pickup device according to Embodiment 5 of the present invention.

FIG. 16 is a view showing a basic configuration of an optical disk device according to Embodiment 5 of the present invention. The optical disk device according to this embodiment has an optical pickup device 100. As the optical pickup device 100, it is possible to use any of the optical pickup devices according to Embodiments 1 through 4.

The optical disk device of this embodiment includes a rotation driving mechanism 102 that holds and rotates DVD, CD or an optical disk for blue-violet laser having the capacity several times that of DVD or CD (referred to as an optical disk 16). The rotation driving mechanism 102 determines the position of the optical disk 16 at a chucking hole 16a formed on the center of the optical disk 16, and rotates the optical disk 16.

The optical pickup device 100 is disposed in such a manner that the objective lens faces the information recording surface of the optical disk 16 driven by the rotation driving mechanism 102, and moves in the radial direction of the optical disk 16 by means of a feeding mechanism 103. The optical pickup device 100, the rotation driving mechanism 102 and the feeding mechanism 103 are controlled by a control circuit 101. The optical pickup device 100 performs recording, reproducing or both of information on the optical disk 16 using the light of the wavelength selected in accordance with the type of the optical disk 16 (DVD, CD or an optical disk for blue-violet laser) among the lights of three kinds of wavelengths λ1, λ2 and λ3 that the laser emitting device 9 (FIG. 1) is able to emit. The signal read from the optical disk 16 by the optical pickup device 100 is demodulated by a demodulation circuit 105.

According to this embodiment, the optical disk device is configured using the optical pickup device described in Embodiments 1 through 4, and therefore the reduction in size and cost of the optical pickup device can be accomplished.

In the above described embodiments, although the respective wavelengths λ1, λ2 and λ3 are approximately 405 nm, approximately 650 nm and approximately 780, it is possible to use any combination of other wavelengths in accordance with the type of the recording medium to be used.

Further, in the above described embodiments, the binary-blazed diffraction grating 19 is used. However, it is only necessary to use an optical axis adjusting element (not limited to the binary-blazed diffraction grating) capable of adjusting the optical axis of the return light of at least one of the wavelengths so that the return lights of the wavelengths λ1, λ2 and λ3 are received by the common light detector 20.

The invention claimed is:

1. An optical pickup device comprising:

a laser emitting device including a first light emitting portion that emits light of a first wavelength, a second light emitting portion that emits light of a second wavelength, and a third light emitting portion that emits light of a third wavelength, wherein a light emitting position of said first light emitting portion and a light emitting position of said third light emitting portion are approximately on the same position as seen in a direction of an optical axis of emitted light;

a light detector, and an optical axis adjusting element for adjusting an optical axis of return light of at least one of said wavelengths among return lights of said first, second and third wavelengths so that respective return lights emitted by said first, second and third light emitting portions of said laser emitting device and reflected by an optical recording medium are received by said light detector, wherein said optical axis adjusting element includes a binary-blazed diffraction grating, and wherein, among lights diffracted by said diffraction grating, zeroth order diffracted lights of return lights of said first and third wavelengths are introduced to said light detector, where signal detection is performed.

2. The optical pickup device according to claim 1, wherein said third wavelength is approximately twice as long as said first wavelength.

3. The optical pickup device according to claim 2, wherein said first wavelength is approximately 405 nm, said second wavelength is approximately 650 nm, and said third wavelength is approximately 780 nm.

4. The optical pickup device according to claim 3, wherein said optical axis adjusting element adjusts said optical axis of said return light of said second wavelength.

5. The optical pickup device according to claim 4, wherein a difference d between steps of said binary-blazed diffraction grating is expressed as:

$$d \approx m\lambda 3/(n3-1)$$

where n3 is a refractive index of said diffraction grating at said third wavelength λ3, and m is an integer number greater than or equal to 1.

6. The optical pickup device according to claim 4, wherein a number of steps of said binary-blazed diffraction grating is in the range from 4 to 6.

7. The optical pickup device according to claim 3, wherein, when a refractive index of said diffraction grating at said first wavelength λ1 is expressed as n1, and a refractive index of said diffraction grating at said third wavelength λ3 is expressed as n3, $$1.0 \leq (n1-1)/(n3-1) \leq 1.08$$

is satisfied.

8. The optical pickup device according to claim 1, wherein said first and third light emitting portions are formed on two substrates bonded to each other in such a manner that said first and third light emitting portions face each other.

9. The optical pickup device according to claim 8, wherein said second light emitting portion and said first or third light emitting portion are formed on a common monolithic type semiconductor substrate.

10. An optical disk device comprising:
 a rotation driving mechanism that rotates an optical disk as an optical recording medium, and
 said optical pickup device according to claim 1 that performs a recording, reproducing or both of information on said optical disk rotated by said rotation driving mechanism.

\* \* \* \* \*